E. R. GOLL.
RIBBON MECHANISM.
APPLICATION FILED AUG. 23, 1910.

1,094,649.

Patented Apr. 28, 1914.
6 SHEETS—SHEET 2.

WITNESSES

INVENTOR,
Eugene R. Goll.
by
Attorney.

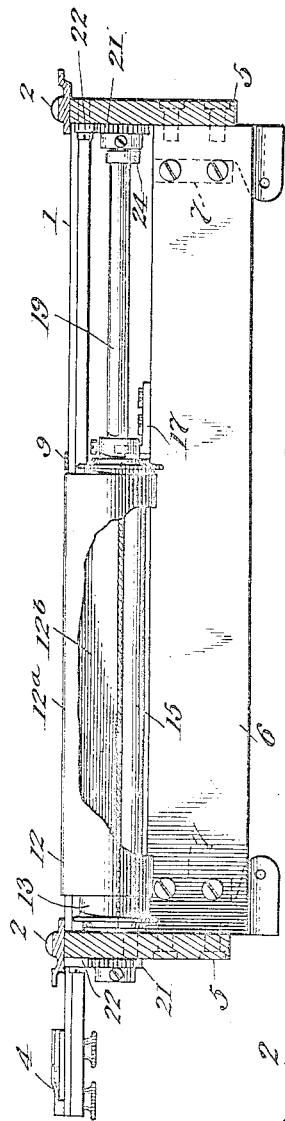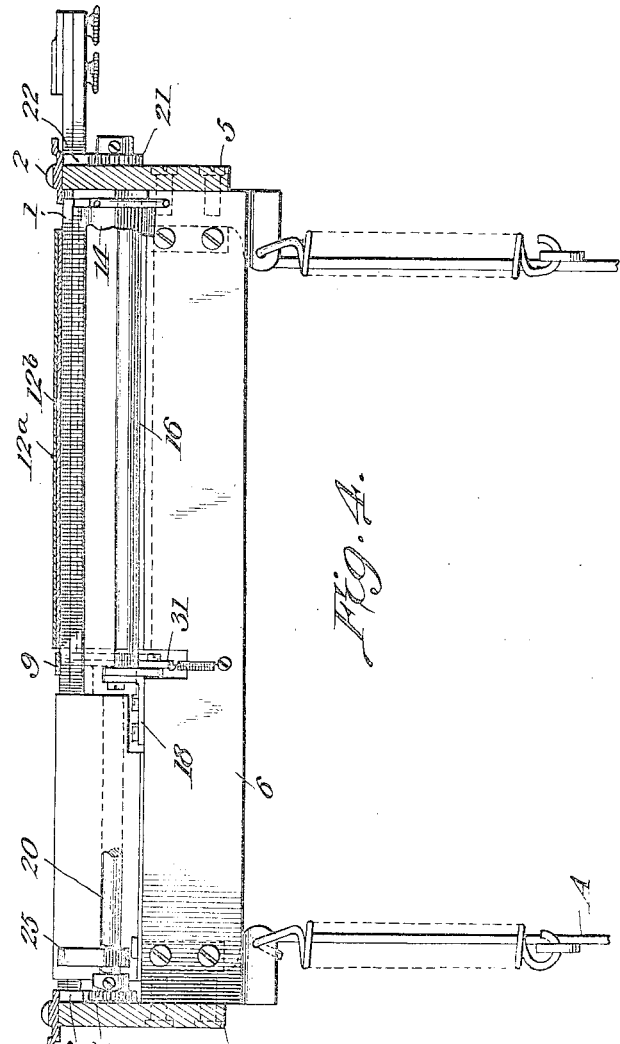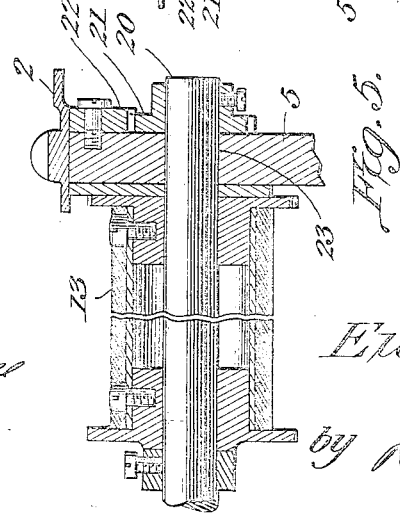

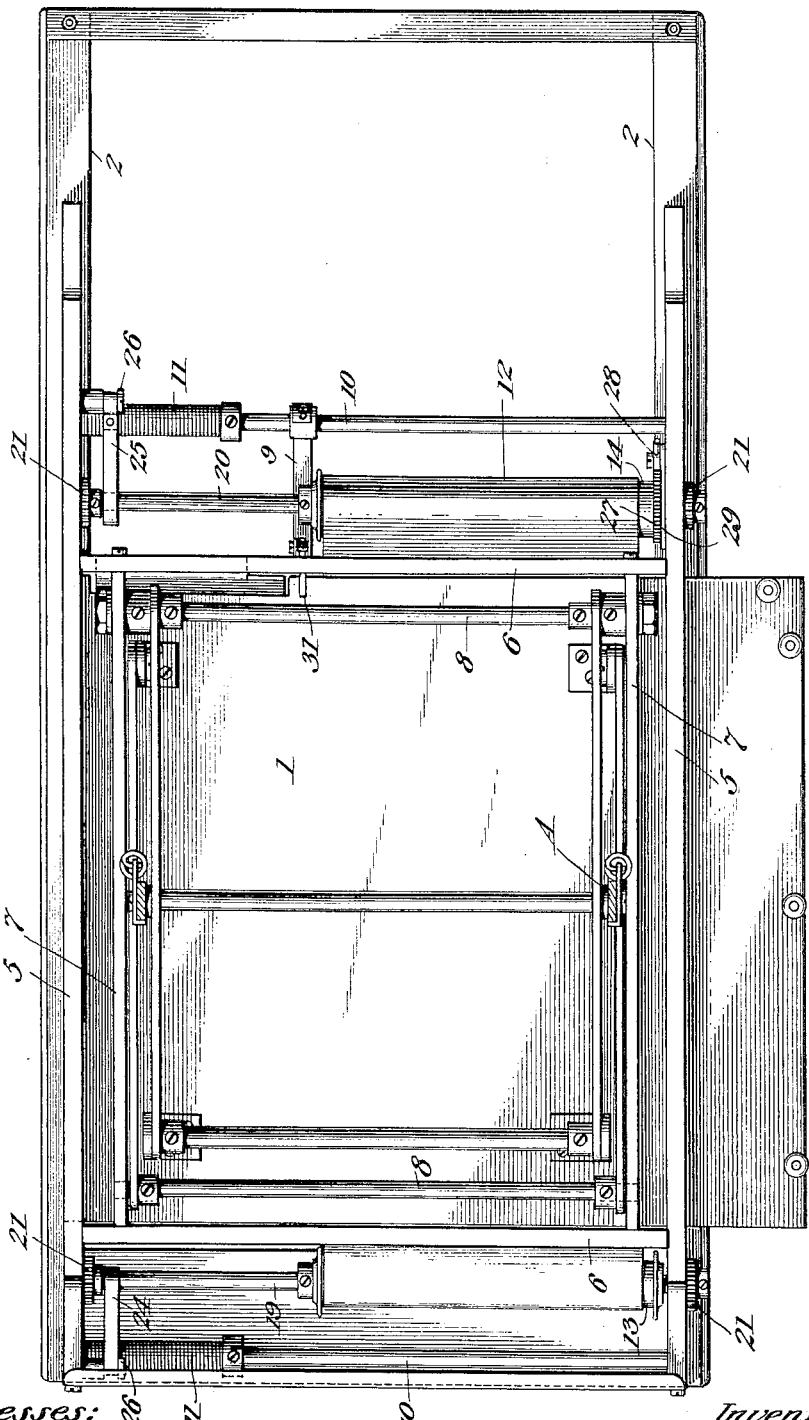

E. R. GOLL.
RIBBON MECHANISM.
APPLICATION FILED AUG. 23, 1910.
1,094,649.
Patented Apr. 28, 1914.
6 SHEETS—SHEET 5.
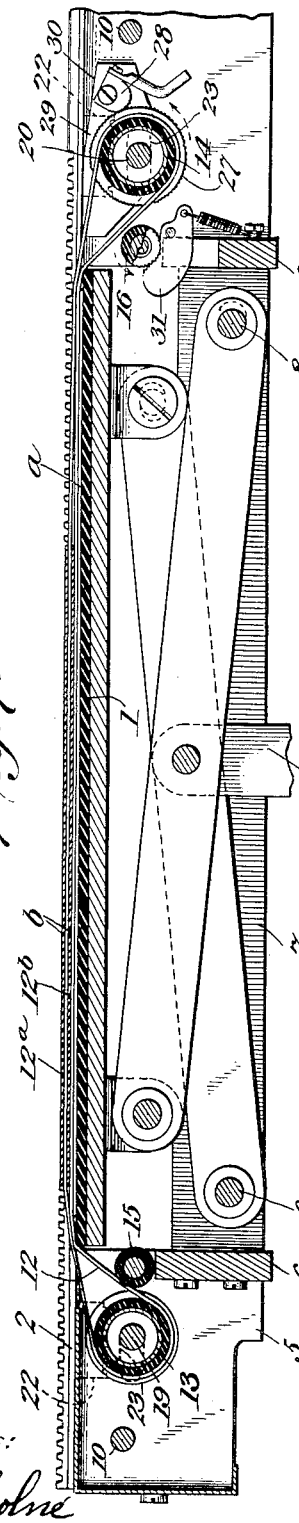
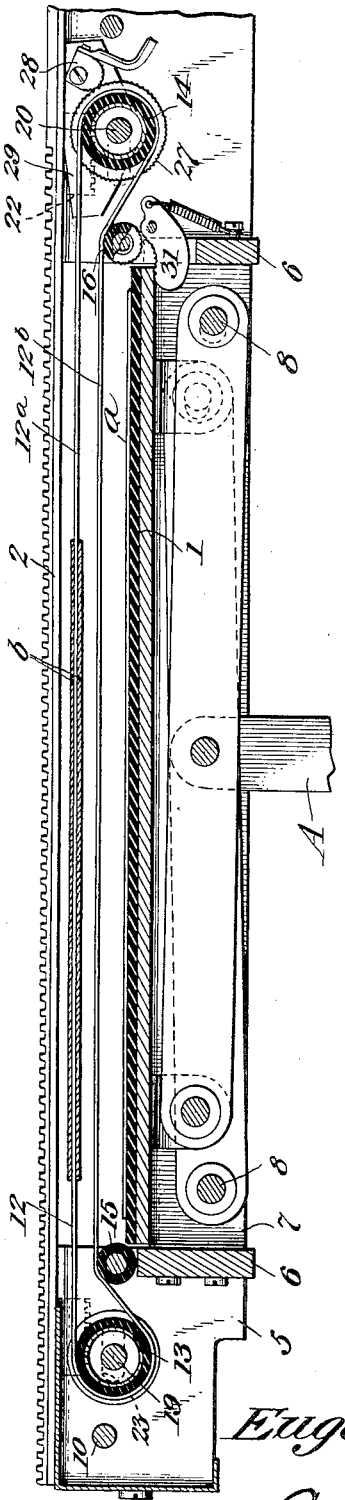
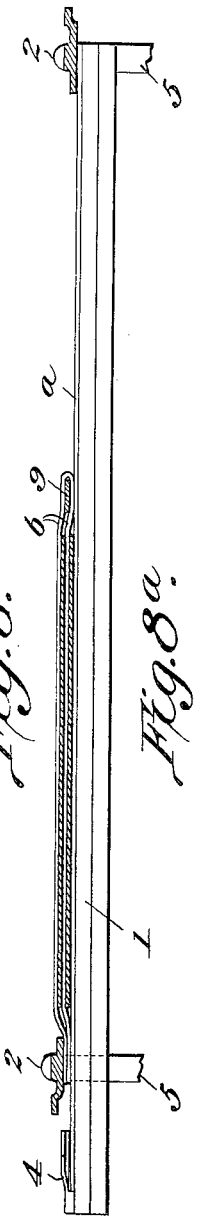
Witnesses:
Inventor,
Eugene R. Goll.
by
Attorney.

E. R. GOLL.
RIBBON MECHANISM.
APPLICATION FILED AUG. 23, 1910.

1,094,649.

Patented Apr. 28, 1914.
6 SHEETS—SHEET 6.

WITNESSES

INVENTOR,
Eugene R. Goll,
by
Attorney.

UNITED STATES PATENT OFFICE.

EUGENE R. GOLL, OF HARRISBURG, PENNSYLVANIA, ASSIGNOR TO ELLIOTT-FISHER COMPANY, OF HARRISBURG, PENNSYLVANIA, A CORPORATION OF DELAWARE.

RIBBON MECHANISM.

1,094,649.  Specification of Letters Patent.  Patented Apr. 28, 1914.

Application filed August 23, 1910. Serial No. 578,562.

*To all whom it may concern:*

Be it known that I, EUGENE R. GOLL, a subject of the King of Hungary, residing at Harrisburg, in the county of Dauphin and State of Pennsylvania, have invented certain new and useful Improvements in Ribbon Mechanism, of which the following is a specification.

This invention relates to ribbon mechanism for typewriting machines, and more particularly to ribbon holding, guiding and feeding mechanism adapted for use in connection with a flat platen and constituting a transfer means supplementary to the primary ribbon mechanism of a typewriter.

The object of the invention is to produce a ribbon mechanism embracing a plurality of superposed ribbon sections disposed opposite the printing area of the platen to transfer impressions to a plurality of work sheets or elements and so related that the separation of said ribbon sections from each other and from the platen and the restoration of the normal relations of said sections will automatically effect the feed of the ribbon sections to present new or unused portions thereof at the printing point.

Other objects subordinate to that stated will hereinafter more fully appear.

Figure 1:
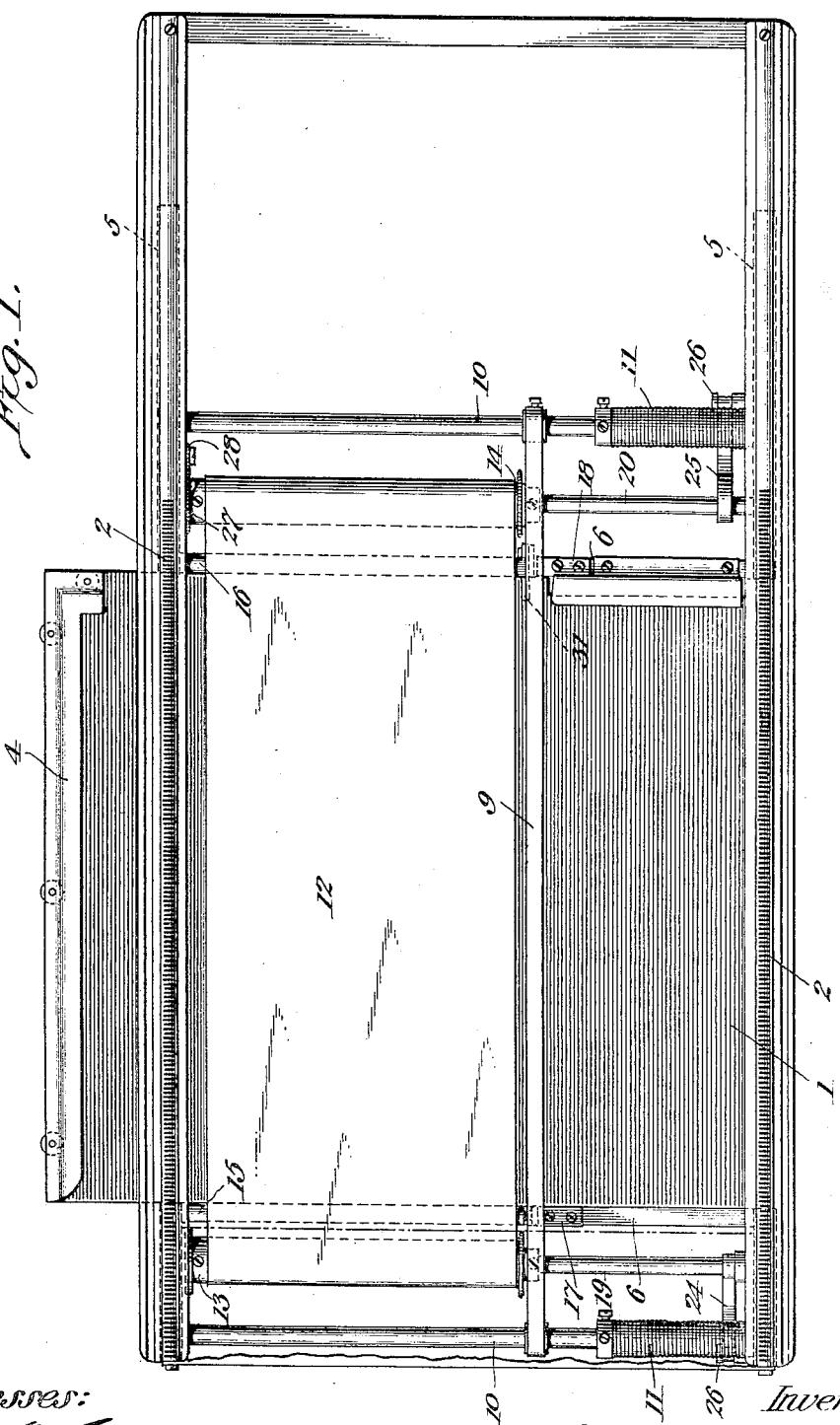
Figure 2:
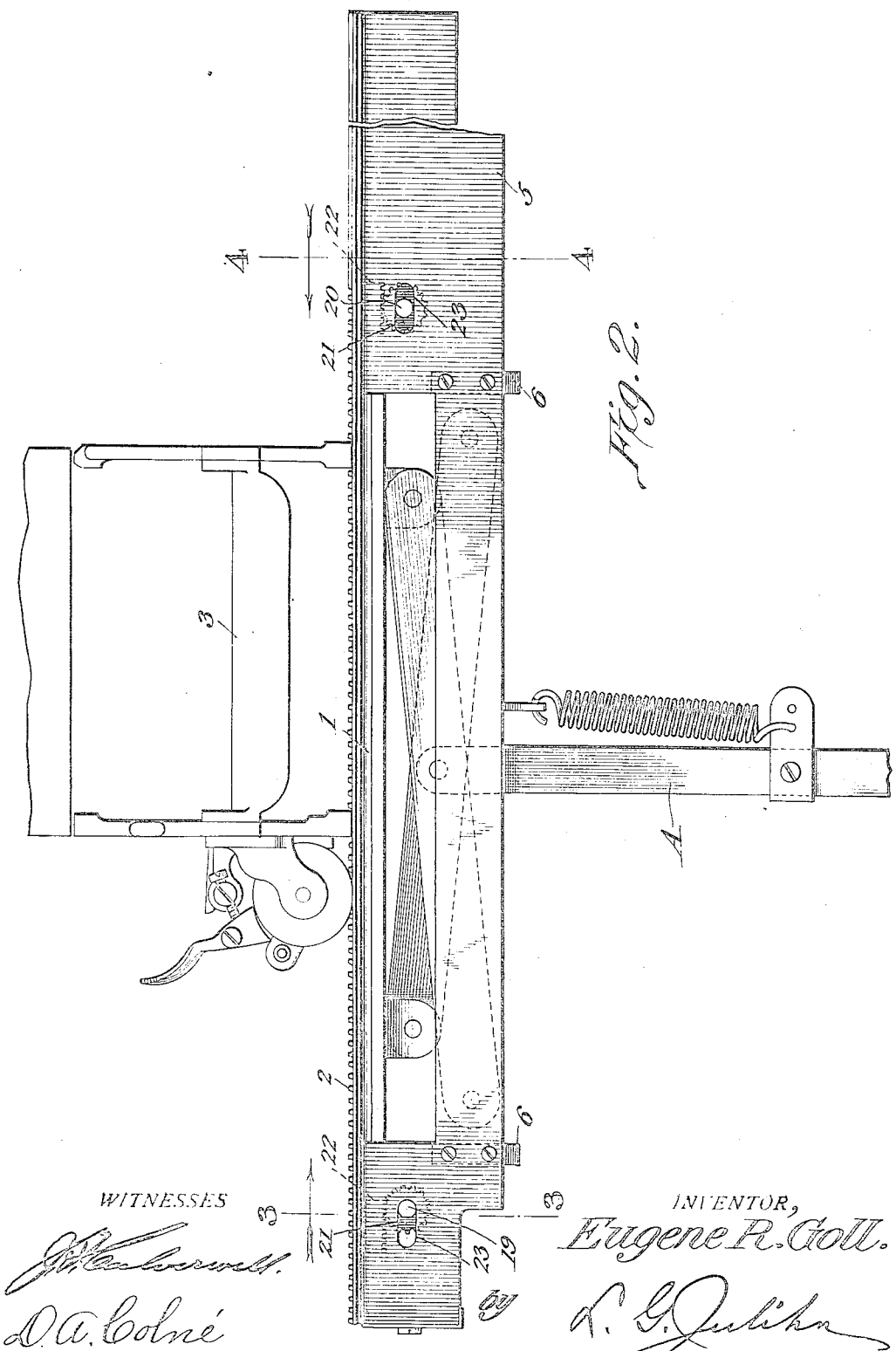

In the drawings Figure 1 is a plan view of what is known as an Elliott-Fisher platen equipped in accordance with my invention. Fig. 2 is a side elevation of the same with the typewriting machine indicated diagrammatically. Fig. 3 is a sectional view on the line 3—3 of Fig. 2. Fig. 4 is another section on the line 4—4 of Fig. 2. Fig. 5 is a detail section through one of the ribbon rolls and adjacent parts. Fig. 6 is an inverted plan view of the platen. Fig. 7 is a longitudinal sectional view of the platen with the parts in normal position for writing. Fig. 8 is a similar view with the parts in the positions they asume during the replacement of the work elements. Fig. 8ª is a transverse section showing the relation of the transfer web and work sheet when the platen is in normal elevated position. Figs. 9, 10, 11, 12 and 13 are diagrammatic views showing successive phases of the operation of the ribbon mechanism.

By way of premise, it may be stated that while my invention is capable of use in other relations, it has been devised with special reference to and is shown in connection with what is known as an Elliott-Fisher billing machine. The Elliott-Fisher machine is a flat platen typewriter including a flat platen 1 having extended along its opposite longitudinal edges tracks or guides 2 upon which travels longitudinally of the platen for line spacing a machine frame 3 supporting printing mechanism, not specifically shown, which travels on the frame 3 transversely of the platen for letter spacing.

Some forms of platen employed in connection with the machine referred to are stationary and are entirely confined between the guides 2. The particular form to which my invention is shown applied, however, comprehends a platen vertically movable toward and away from the tracks or guides which are located above the platen and are stationary, the left hand edge of the platen being extended beyond the left hand rail, as shown in Fig. 1 and equipped with a work confining device 4.

The platen is raised and lowered by mechanism the specific form of which constitutes no part of my invention, but is shown at A in Fig. 7, for instance. This mechanism A comprehends cross levers which support the platen and a treadle for operating it, the latter being omitted in the drawings. The tracks or guides 2 are supported by side plates 5 connected by cross bars 6 to form what is ordinarily known as the platen frame, the transverse bars 6 being connected by other bars 7 which extend longitudinally of the platen and afford bearings for shafts 8 which constitute supporting elements for the systems of cross levers embraced in the platen raising and lowering mechanism A.

Disposed longitudinally of the platen is a tape 9 which serves as a guide for the folded edge or bight of a folded form or work element. This tape is connected to transverse shafts 10 mounted in the side members of the platen frame and urged by tension springs 11 to hold the tape taut. In the particular class of work which will be referred to for the purposes of this explanation, a base or ledger sheet *a* is supported directly upon the platen 1 and is clamped thereon by the rails 2. Above this base sheet *a* is disposed what is known as the folded form *b* which is merely a sheet of paper folded longitudinally and having the tape 9 resting within the fold or bight and the opposite edges of the form extended under the left hand rail 2. The matter printed on the top fold or layer which constitutes the bill sheet of the form is imprinted directly by the typewriter through the medium of its ribbon and my invention is more particularly concerned with an instrumentality whereby the matter thus printed on the top sheet is transferred to the subjacent sheet of the folded form known as the duplicate bill sheet and to the ledger sheet $a$.

The manifolding or transference referred to is effected by means of an endless ribbon 12 passed around rollers 13 and 14 beyond the front and rear edges of the platen and having both of its horizontal sections $12^a$ and $12^b$ disposed above the platen, as clearly shown in Figs. 7 and 8. The upper section $12^a$ of the ribbon is disposed within the folded form, that is to say, it extends longitudinally of the platen between the upper and lower sheets of the form. The lower section $12^b$ of the ribbon is similarly disposed between the lower or duplicate sheet of the form and the subjacent ledger sheet $a$. It will therefore appear that when matter is imprinted upon the bill sheet, the record will be manifolded by transference through the upper section of the ribbon to the lower sheet of the folded form and through the lower section of the ribbon to the ledger sheet.

It will be noted by reference to Fig. 7 that when the parts are in their normal or writing positions, the platen 1 is sufficiently elevated to clamp the work sheets or elements against the under sides of the rails 2 and that the writing surface of the platen is sufficiently elevated with respect to the rollers 13 and 14 to impart a downward inclination to those portions of the ribbon which extend to the rolls from the opposite ends of the platen. Furthermore, it will be noted that when the platen is dropped, as shown in Fig. 8, it will recede from the ribbon and that the horizontal sections of said ribbon will recede from each other, thus effecting a relative separation of the ribbon sections and platen to facilitate displacement and replacement of the work elements.

Beyond the opposite ends of the platen are a pair of guide rolls 15 and 16 having their left hand ends journaled in the adjacent frame plate 5 and their right hand ends journaled in bearings 17 and 18 supported by transverse members of the platen frame. These guide rollers 15 and 16 are disposed at a sufficient elevation with reference to the lower sides of the ribbon rollers 13 and 14 and to the surface of the platen in the depressed position thereof to cause said rollers to sustain the lower horizontal section $12^b$ of the ribbon in a position somewhat higher than the bottoms of the ribbon rolls and also in spaced relation to the platen.

It will be obvious from a comparison of Figs. 7 and 8 that when the platen is depressed from its normal position a certain amount of slack will be created in the ribbon, but it is desirable that the ribbon shall be held taut at all times since such condition is absolutely necessary during the writing operation and is highly desirable when the platen is depressed in order that the ribbon will offer no obstruction to the insertion of the new work elements. For this reason provision is made for exerting more or less tension on the ribbon to maintain the same taut under all conditions.

In accordance with my invention the desired result is attained by mounting both of the ribbon rollers 13 and 14 for bodily movement longitudinally of the platen and by placing both of said rollers under tension, tending to urge the same apart to take up any slack which may be produced from any cause in the ribbon. Each of the rollers 13 and 14 is mounted to rotate freely on a shaft 19 or 20 each shaft having at its opposite ends fixed pinions 21 engaging the under side of short stationary racks 22, the extremities of the shafts resting within longitudinal slots 23 in the side plates 5 of the platen frame. The rack and pinion connection between the stationary portion of the structure, to-wit the platen frame and the shafts 19 and 20, is designed to compel said shafts to remain parallel under all conditions. The shafts 19 and 20 are constantly urged in opposite directions by springs 24 and 25 secured at their outer ends to pins 26 projecting from one of the plates 5 and having their inner ends coiled about and secured to the shafts 19 and 20, as shown in Figs. 1, 4 and 9 to 13.

The construction as thus far described is not original with me, since it has been proposed to mount an endless ribbon in substantially the relation stated with respect to a vertically movable platen and having provision for maintaining the ribbon in taut condition and for effecting an effectively close relation of the upper and lower ribbon sections and the platen in the elevated position of the latter and for securing a separated relation of the ribbon sections with respect to each other and to the platen in the depressed position of the latter. It will be observed, however, that considering the structure as thus far described no provision has been made for effecting a feed of the ribbon, that is to say, a longitudinal movement of the ribbon whereby unused portions thereof will be successively presented at the printing point.

My invention relates primarily to the ribbon feed and embraces the described construction only in so far as the latter enters into combination with certain other elements and features to produce an operative whole. It is intended that the ribbon shall be fed longitudinally a predetermined distance each time the platen is operated, but it is obvious that relative movement of the ribbon and paper should not be effected in the direction of the feed while the surfaces of the ribbon and paper are held in close contact. The obvious result of a feed at such time or under such conditions would be the smudging or smearing of the paper. In accordance with my invention, therefore, the mechanism for maintaining the ribbon under tension is so combined with other elements that it effects not only the maintenance of the ribbon in taut condition, but also effects a longitudinal feed thereof at a time and in a manner to prevent the smudging of the paper.

One of the flanges of the ribbon roller 14, to-wit the one located at the left side of the platen, see Fig. 7, is provided with a knurled periphery 27 designed to be engaged by an eccentric dog 28 which when in effective engagement with the periphery 27 dogs the roller 14 against rotary movement in one direction, to-wit the direction of the dotted arrow in Fig. 7. The dog 28 is mounted on a dog carrier 29 mounted to rock on the shaft 20 and having a straight top face 30 which is normally disposed at a slight angle with respect to the under side of the adjacent rail 2 with which said dog carrier is designed to contact when rocked upon the shaft 20. Similarly, the rear guide roll 16 is dogged against rotary movement in the direction of the dotted arrow in Fig. 7, by a spring-urged dog 31, said roll being free to rotate in the opposite direction. The guide roll 15 at the front end of the platen may be likewise dogged, but I find in practice that the dogging of one only of said guide rolls is sufficient. The inner or front end of the dog 31 is extended somewhat to bring it within the path of the downward movement of the platen 1 in order that said dog will be engaged and moved to its releasing position as said platen approaches the downward limit of its movement.

Figure 9:
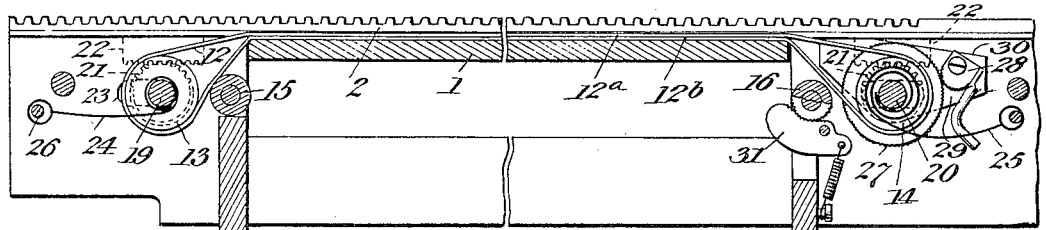
Figure 10:
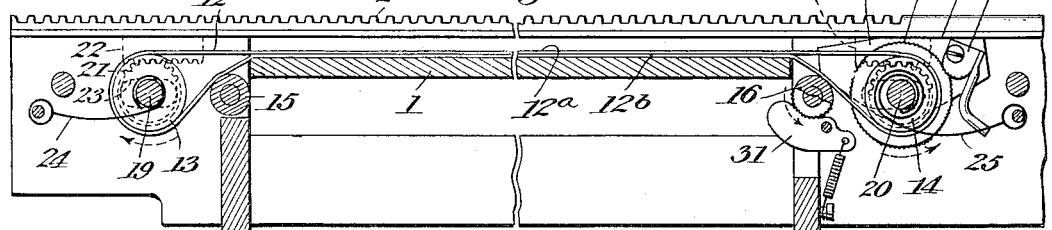
Figure 11:
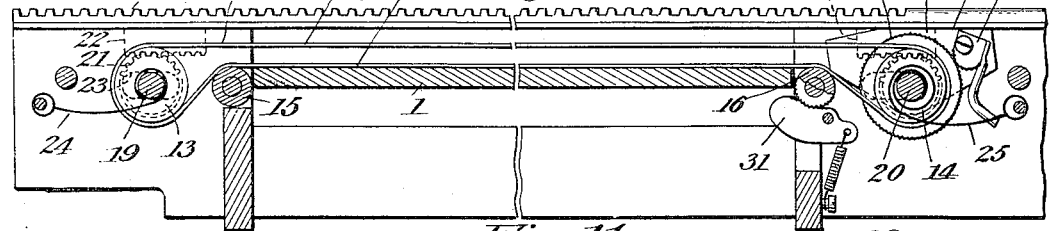
Figure 12:
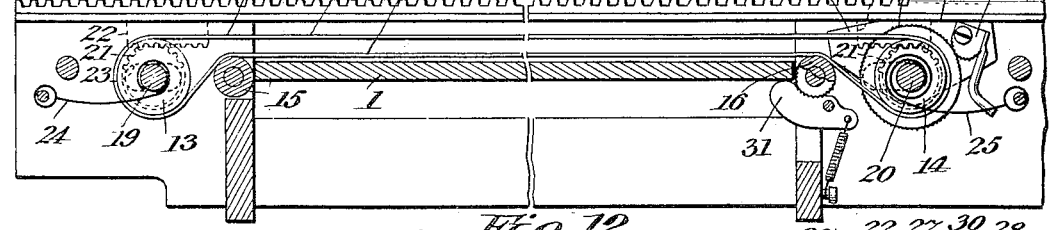
Figure 13:
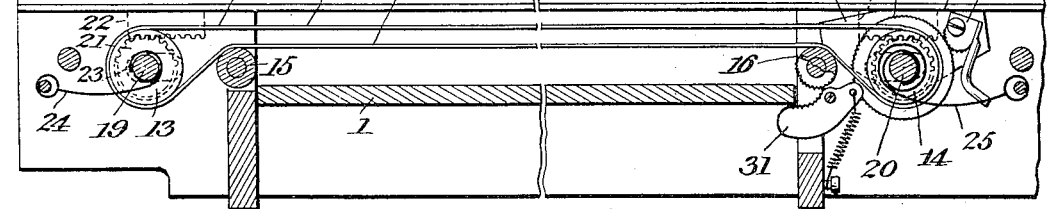

The operation of the ribbon mechanism will now be described, reference being made more particularly to Figs. 7 and 8 and to the diagrammatic views, Figs. 9 to 13 inclusive. Normally the parts will assume the positions indicated in Figs. 7 and 9, the platen being elevated to the printing position and the upper and lower ribbon sections, together with the several alternating work sheets, being held in smooth, spreadout condition and in close relation to each other and to the platen. The typewriting machine proper is then moved to the printing position and the desired entry is typewritten on the top or bill sheet of the folded form, duplicates of the record being transferred by the upper and lower sections of the ribbon to the work elements subjacent thereto. When it is desired to replace one or more of the work elements, the platen depressing mechanism is operated to drop the platen in order to release the work elements and to separate the ribbon sections and platen and to also cause the longitudinal feed of the ribbon. The first downward movement of the platen from the position shown in Fig. 9 will bring the upper surface of the platen on a horizontal line with the upper surfaces of the two ribbon rolls 13 and 14, as shown in Fig. 10. This depression of the platen will create more or less slack in the ribbon which will be taken up by the recession of the rolls 13 and 14 under the impulse of the springs 24 and 25. During this recession of the rolls said rolls will rotate in the direction of the arrows in Fig. 10, but no actual feed of the ribbon relative to the platen will be effected, that is, no longitudinal movement of that portion of the ribbon located above the platen will be occasioned. As the two ribbon rolls are receding from the position shown in Fig. 9 to that shown in Fig. 10, the rotary movement of the rear roll 14 will, by reason of the engagement of the latter with the dog 28, rock the dog carrier 29 on its axis and as the rolls 13 and 14 reach the positions indicated in Fig. 10, the upper surface 30 of the dog carrier 29 will engage the under side of the stationary rail 2, thus arresting further movement of the carrier and rendering effective the action of the dog 28 to prevent further rotary movement of the roller 14 in the indicated direction. The platen will now continue its movement from the position shown in Fig. 10 to that shown in Fig. 11. During this movement the lower section of the ribbon will recede from the upper section thereof, thus creating additional slack in the ribbon which must be taken up. Now it will be remembered that upon the recession of the rolls 13 and 14 to the positions shown in Fig. 10, the roll 14 becomes automatically locked against further rotary movement in the direction of the arrow. Therefore, as the platen recedes from the position shown in Fig. 10 to that shown in Fig. 11, the roller 14 becomes in effect a direct connection between the rear end of the upper section of the ribbon and the spring 25. Said spring will therefore take up the slack produced in the ribbon by drawing the roll 14 laterally, thereby taking up the slack occasioned in those portions of the ribbon lying between the opposite ends of the platen and the two rolls 13 and 14. This slack between the platen and the roll 14 is taken up directly by the recession of the roll from the platen, whereas that portion of the slack which is occasioned at the opposite end of the platen, to-wit between the platen and the roll 13, will be taken up by the pull exerted upon the upper section of the ribbon and thence around the roll 13 to the point at which the slack is produced. It should be remembered that the two springs 24 and 25 are of equal strength, or balanced, and it will therefore be noted that upon the locking of the rear roller 14 the effect is that of a direct connection with the rear end of the upper ribbon section which continues around the front roll and is in effect anchored to the platen and to the guide roll 16 by the friction between the ribbon and said elements. The spring 25 is therefore pulling upon one end of what is in effect a looped flexible piece the opposite end of which is fixed, whereas the front spring 24 is drawing in the opposite direction upon a roller located in the bight of the loop. Therefore, upon the locking of the roller 14, the rear spring 25 immediately overbalances the front spring 24, in accordance with the well known principle of the movable pulley, and during the rearward movement of the roller 14 from the position shown in Fig. 10 to that shown in Fig. 11, takes up the slack in the ribbon. The front roller 13 has no bodily movement, but rotates on a temporarily stationary axis as the ribbon is drawn around it in the direction of the arrow. It is true that during this phase of the motion the upper section of the ribbon will move longitudinally, but as the platen will have receded, the paper and this section of the ribbon will not be held in close contact, the lower sheet of the folded form dropping away from the ribbon and the upper sheet of said form lying lightly thereon. The relative movement of the upper ribbon section and the superposed sheet will therefore not result in smudging the paper. There can be no smudging of the sheets by the lower ribbon section during this period of the movement, since, as already stated, the lower section of the ribbon lying over the platen will have no longitudinal movement whatever. As the platen continues to recede from the position shown in Fig. 11 to that shown in Fig. 12, there will be no slacking of the ribbon, since the lower section of the latter will be resting upon the guide rolls 15 and 16 and the sole effect of the platen movement therefore will be to cause said platen and the ledger sheet imposed thereon to drop from the ribbon until finally the platen comes in contact with the dog 31, as shown in Fig. 12. During this movement of the platen from the position shown in Fig. 11 to the position shown in Fig. 12, the guide roll 16 will remain locked, thus continuing to furnish an anchor point of frictional resistance to the ribbon, notwithstanding the withdrawal of the platen from the latter and the previously established relation between the two ribbon rolls will therefore be maintained. When the platen continues to recede from the position shown in Fig. 12 to that shown in Fig. 13, the dog 31 will be withdrawn from the rear guide roll 16 and the latter being free to rotate, will destroy the anchor point of the ribbon. The rear spring 25, having now lost the advantage which it gained over the spring 24, will now be overbalanced by the spring 24 which will cause the further recession of the front ribbon roller 13 from the platen, thus, through the medium of the ribbon, drawing the rear roller 14 toward the platen until the two springs 24 and 25 are again in counterbalancing relation with the two ribbon rollers equidistant from the positions occupied by said rolls at the beginning of the operation, as shown in Fig. 9. This restoration of the counterbalancing relation between the rollers will have the effect of shifting the entire ribbon loop bodily toward the front of the machine, but without loss of the longitudinal feed imparted to the ribbon by the recession of the rear ribbon roll subsequent to the locking thereof against rotation. Attention is now directed to the fact that it is not until this final phase of the operation, that is to say, it is not until the platen and the paper carried thereby have receded from the ribbon and effected the release of the rear guide roll 16 that the lower ribbon section has any longitudinal movement whatever with respect to the platen. The ribbon feed will now have been completed and the parts being in the positions shown in Fig. 13, new work sheets or elements will be placed in position and the platen returned to its initial or normal position shown in Fig. 9. This will cause both the upper and lower ribbon sections to assume an angular formation and will cause the front and rear ribbon rolls to be drawn toward the platen from the positions shown in Fig. 13 to those shown in Fig. 9, thus restoring the parts for a repetition of the described operation.

The term web section as used herein is intended to define broadly strands of transfer material whether of a single web or a plurality of webs, regardless of the specific character of the transfer material, provided only that it be capable of properly transferring the printed record.

I do not claim herein the broad idea of a transfer web and platen relatively movable toward and away from each other and means whereby such relative movement results in the feeding of the transfer web. Neither do I make claim to the broad idea of a flat platen and a plurality of transfer web sections and means for effecting a separative movement of the platen and web sections to separate the web sections from each other and from the platen. On the contrary I am aware that inventions corresponding to the definitions just recited are described and claimed in the co-pending applications for Letters Patent Numbers 606,931 and 606,933 of H. A. Foothorap.

It is thought that from the foregoing the construction and operation of my invention will be clearly comprehended, but I reserve the right to effect such changes in and modifications of the illustrated structure as may be found desirable to adapt the same to relations other than the few chosen for illustrative purposes.

What I claim is:—

1. The combination with a platen and a transfer web coöperatively related thereto, of supporting means for the web, the web supporting means and platen being relatively movable to slack the web and to take up the slack, said platen and web supporting means being constructed and related to feed the web longitudinally as the slack therein is taken up.

2. The combination with a transfer web, of a platen and platen supporting means relatively movable to produce slack in the web, and tension mechanism coacting with the web to take up the slack and effect a longitudinal feed of the web.

3. The combination with a movable platen and web carrying means, of an endless web movable with the carrying means, the movement of the platen and carrying means serving to slack the web and to take up the slack by a longitudinal feed of the web.

4. The combination with an endless transfer web, of a flat platen, rollers around which the web is led, said rollers and platen being relatively movable, and means coacting with the rollers and web whereby relative movement of the platen and rollers will result in a longitudinal feed of the web.

5. The combination with a platen, of an endless web, carriers supporting said web in a loop, said platen being movable in a lateral direction with respect to said web and coacting with the latter, and means whereby the movement of the platen will result in relative movement of the web carriers to feed the web.

6. The combination with two carriers, a transfer web extending between the same, means coacting with the web intermediate of the carriers to move the same laterally, and means for moving a carrier to take up slack in the web and thereby effect a longitudinal feed of said web.

7. The combination with a transfer web and two carriers therefor, of means intermediate of the carriers and coacting with the web to move the same laterally, and means for effecting both rotary and bodily movement of a carrier to feed the web.

8. The combination with a transfer web and two carriers therefor, of a movable platen arranged to engage the web at a point intermediate of the carriers and to move the same laterally and permit lateral movement of the web in the opposite direction, and means coacting with a carrier to take up the slack in the web produced by the movement of the platen and to effect an endwise feed of the web.

9. The combination with a transfer web and two carriers therefor, of a movable platen arranged to engage the web at a point intermediate of the carriers and to move the same laterally and permit lateral movement of the web in the opposite direction, and means coacting with a carrier to take up the slack in the web produced by the movement of the platen and to effect an endwise feed of the web by both bodily and rotary movement of said carrier.

10. The combination with an endless web, carriers therefor and a movable platen coacting therewith, of means coacting with the carriers to maintain the web in taut condition and to effect an endwise feed of the web when the platen is operated.

11. The combination with an endless web, and carriers therefor, of a platen, said web and platen being relatively movable in a lateral direction with respect to the web and coacting to decrease the distance between the carriers, means whereby relative separative movement of the carriers will be effected when permitted by the relative movement of the web and platen, and means whereby the relative movement of the carriers will result in a longitudinal feed of the web.

12. The combination with a platen, an endless web, carriers for said web retaining the same in the form of a loop having superposed sections located opposite the same side of the platen, said web and platen being relatively movable in a lateral direction with respect to the web, and mechanism whereby such relative movement of the web and platen will effect movement of the carriers to feed the web longitudinally.

13. The combination with a platen and a plurality of transfer web sections disposed thereover, of means for effecting relative movement of the web sections and platen in a lateral direction with respect to the webs, and means whereby such relative movement of the platen and web sections will result in longitudinal feed of said web sections.

14. The combination with a platen and a plurality of transfer web sections disposed thereover, of mechanism operative to effect a lateral separative movement of the web sections with respect to each other and to the platen, and mechanism coacting with said means to feed the web sections longitudinally.

15. The combination with a movable platen and a plurality of web sections disposed opposite the same, of means for moving the platen away from the web sections, means for effecting a separative movement of the web sections as the platen is moved, and means whereby one of said web sections will be fed longitudinally after the web sections are separated and whereby the other web section will be fed longitudinally after the same is separated from the platen.

16. The combination with a movable platen, of an endless transfer web having upper and lower sections disposed opposite the platen, means whereby the movement of the platen will effect relative separative movement of the two web sections and of the platen and the adjacent web section, and means coöperating with the means last named to cause a longitudinal feed of the web sections when the same are out of contact with each other and with the platen.

17. The combination with a platen and an endless web relatively movable in a lateral direction with respect to the web, of web carriers, reactive means for moving the carriers relatively when such movement is permitted by the relative movement of the platen and web, and means whereby such relative movement of the carriers will result in a longitudinal feed of the web.

18. The combination with a movable platen and an endless web located thereover, of rotary carriers for the web, springs tending to urge the carriers apart, and a dog for one of said carriers.

19. The combination with a platen, of an endless web disposed thereover, rotary carriers for the web, springs exerting a separative force on the carriers, a normally inactive dog, and means whereby said dog will be rendered effective to dog one of the carriers against rotary movement during the bodily movement of said carrier and after a predetermined rotary movement thereof.

20. The combination with an endless transfer web, rotary carriers therefor, balanced springs tending to effect a bodily separative movement of the carriers, a dog for one of said carriers, automatic means for bringing the dog into action to dog the carrier against further rotary movement during the bodily movement of said carrier, a rotary guide for the transfer web, a dog preventing rotation of the guide in one direction, and a movable platen coacting with the transfer web and with the dog last named.

21. The combination with a platen, a transfer web and web supporting means, of means whereby relative movement of the web supporting means and the platen will be effected to alternately slack said web and take up the slack to effect successive longitudinal feeding movements of the web in one direction.

In testimony whereof I affix my signature in presence of two witnesses.

EUGENE R. GOLL.

Witnesses:
A. L. D. LUCK,
LOUISE MAIER.